(12) United States Patent
Boccon-Gibod

(10) Patent No.: US 11,616,850 B1
(45) Date of Patent: Mar. 28, 2023

(54) CONNECTION MANAGEMENT TECHNIQUES

(71) Applicant: Fitbit, Inc., San Francisco, CA (US)

(72) Inventor: Gilles Luc Jean Francois Boccon-Gibod, San Francisco, CA (US)

(73) Assignee: FITBIT, INC., San Francisco, CA (US)

( * ) Notice: Subject to any disclaimer, the term of this patent is extended or adjusted under 35 U.S.C. 154(b) by 232 days.

(21) Appl. No.: 16/803,675

(22) Filed: Feb. 27, 2020

Related U.S. Application Data

(60) Provisional application No. 62/890,887, filed on Aug. 23, 2019.

(51) Int. Cl.
| | |
|---|---|
| *H04L 67/51* | (2022.01) |
| *H04L 67/568* | (2022.01) |
| *H04W 76/11* | (2018.01) |
| *H04W 4/80* | (2018.01) |
| *H04L 67/01* | (2022.01) |

(52) U.S. Cl.
CPC .............. *H04L 67/51* (2022.05); *H04L 67/01* (2022.05); *H04L 67/568* (2022.05); *H04W 4/80* (2018.02); *H04W 76/11* (2018.02)

(58) Field of Classification Search
CPC ..... H04L 67/16; H04L 67/2842; H04L 67/42; H04W 4/80; H04W 76/11
See application file for complete search history.

(56) References Cited

U.S. PATENT DOCUMENTS

| | | | |
|---|---|---|---|
| 6,501,947 B1 | 12/2002 | Hunzinger et al. | |
| 7,043,467 B1 | 5/2006 | Milito et al. | |
| 8,824,546 B2 | 9/2014 | Coulombe et al. | |
| 8,850,029 B2 | 9/2014 | Melnyk et al. | |
| 9,253,704 B1 | 2/2016 | Sarkar et al. | |
| 2003/0053481 A1 | 3/2003 | Abiru et al. | |
| 2004/0088413 A1 | 5/2004 | Bhogi et al. | |
| 2005/0102525 A1 | 5/2005 | Akimoto | |
| 2006/0039349 A1 | 2/2006 | Samuel et al. | |
| 2016/0173450 A1 | 6/2016 | Mircescu et al. | |
| 2016/0371961 A1* | 12/2016 | Narang | G08B 29/18 |
| 2016/0381633 A1 | 12/2016 | Chen | |
| 2017/0063690 A1 | 3/2017 | Bosshart | |
| 2017/0187828 A1 | 6/2017 | Soji et al. | |

(Continued)

OTHER PUBLICATIONS

Office Action for U.S. Appl. No. 16/803,660, dated Dec. 24, 2020, 8 pages.

(Continued)

*Primary Examiner* — Suraj M Joshi

(74) *Attorney, Agent, or Firm* — Dority & Manning, P.A.

(57) ABSTRACT

Devices communicating wirelessly may experience temporary disconnections. While disconnected, a device may be unable to notify the other device that an update has occurred and that data previously used for communication may no longer be current. An ephemeral characteristic can be used by a service device that is updated each time a change occurs on the service device that may impact communications. A client device can use cached service data to attempt to write to this ephemeral characteristic. If the write does not complete successfully, it can be determined that the cached data is no longer current and a service request change can be used to cause the client device to flush the cached data and request current data from the service device.

20 Claims, 10 Drawing Sheets

(56) References Cited

U.S. PATENT DOCUMENTS

| | | |
|---|---|---|
| 2017/0257372 A1 | 9/2017 | Meriac |
| 2017/0295083 A1 | 10/2017 | Brooks et al. |
| 2018/0373748 A1* | 12/2018 | Kuhnke .............. H04N 21/262 |
| 2019/0028445 A1* | 1/2019 | McLaughlin ......... H04W 12/02 |
| 2019/0033845 A1 | 1/2019 | Cella et al. |
| 2019/0045427 A1 | 2/2019 | Logan |
| 2019/0342891 A1 | 11/2019 | Asterjadhi et al. |

OTHER PUBLICATIONS

Office Action for U.S. Appl. No. 16/867,346, dated Jan. 25, 2021, 22 pages.

Office Action for U.S. Appl. No. 16/867,852, dated Jan. 6, 2021, 14 pages.

* cited by examiner

CONNECTION MANAGEMENT TECHNIQUES

CROSS-REFERENCE TO RELATED APPLICATIONS

This application claims priority to U.S. Provisional Patent Application No. 62/890,887, filed Aug. 23, 2019, and entitled "Communication and Connection Techniques," which is hereby incorporated herein by reference in its entirety and for all purposes. This application is also related to co-pending U.S. patent application Ser. No. 16/803,660, filed Feb. 27, 2020, and entitled "Device Communication Techniques," which also claims priority to this provisional application.

BACKGROUND

Wireless communication capability is increasingly being incorporated into a variety of devices. A given device might be able to communicate with a number of other devices using a number of different communication protocols. Some of these devices may be small footprint or limited capability devices that are only able to use transmission protocols with limited bandwidth or security. Further, in some situations it may be difficult to communicate with a number of devices concurrently using the same protocol, or may take significant time and resources to determine whether an update has occurred that could impact communications.

BRIEF DESCRIPTION OF THE DRAWINGS

Various embodiments in accordance with the present disclosure will be described with reference to the drawings, in which.

DETAILED DESCRIPTION

Figure 1:
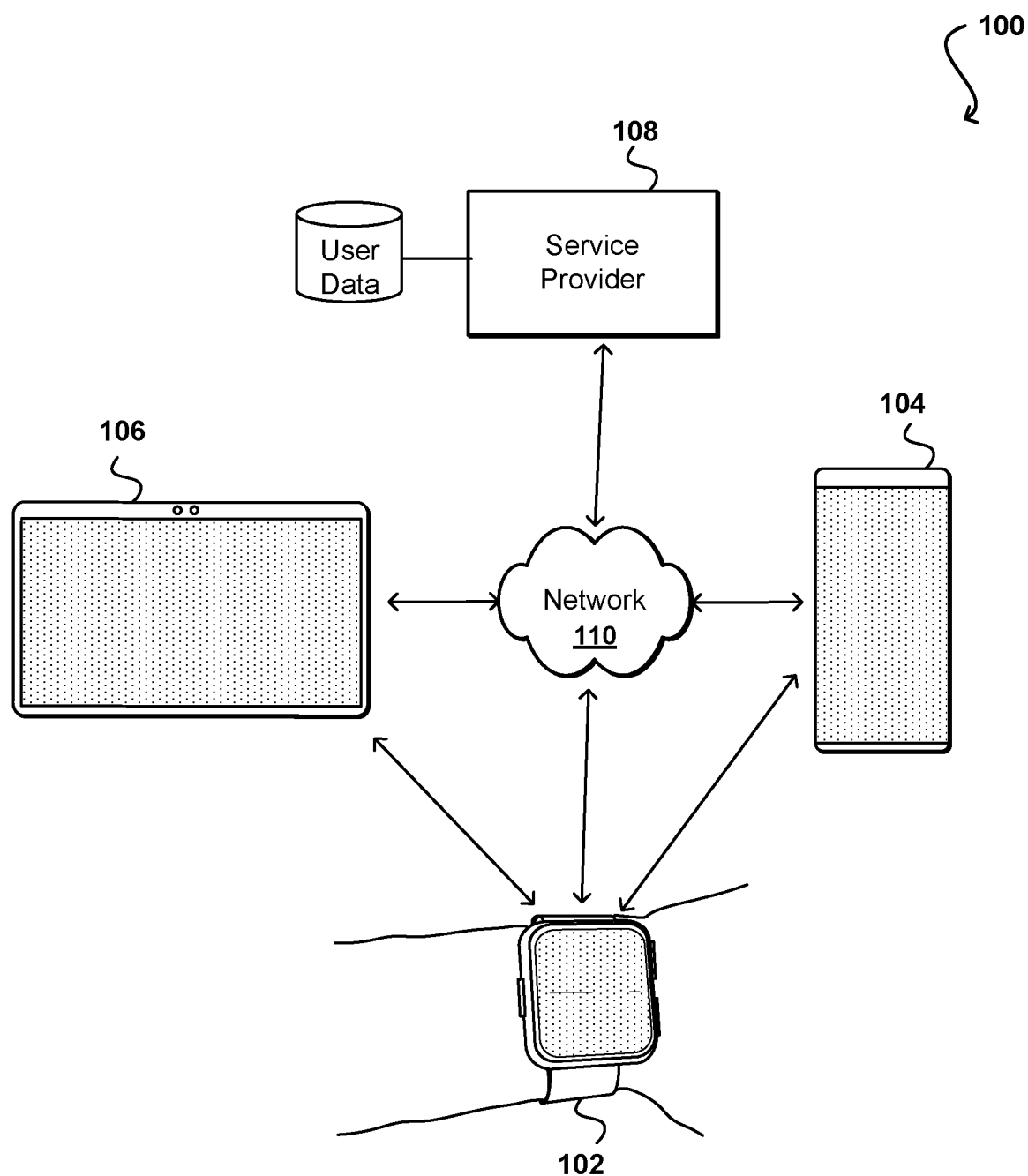
FIG. 1 illustrates an example environment in which aspect of various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of communications between devices. In some embodiments, compression can be performed to headers of communication packets to be transmitted over a wireless channel. For one or more fields that are not required for a packet header, a determination can be made as to whether there is a default or expected value for a given field, which may correspond to an agreed-upon or previous value, among other such options. If the value for a header field matches the default value for a given packet, then that value can be excluded from the header. Flags can be set for various header fields to indicate whether or not a value is included for a given field, and if not then a default value should be used for that field. Such an approach helps to reduce packet size, or at least allow for larger payloads within that packet size. Such approaches also provide for bi-directional communication capability, including the ability to initiate sessions from different devices, as well as to discovering other devices available for communication. A default value compression approach can also be used with address mapping to allow for address translation at the packet level, enabling multiple devices to communicate over a wireless channel that otherwise does not allow for concurrent communication sessions. In some embodiments, services exposed by a first device may change, but in the event of a disconnect a second device may be unable to determine the change using a convention approach. Approaches in accordance with various embodiments can utilize ephemeral characteristics, where a first characteristic has a fixed identifier (such as a UUID) and a second characteristic has a variable identifier. In at least one embodiment, the second device can send a write request for the second characteristic using a UUID that was cached from a prior connection state. If the second device receives a write confirmation from the first device, the second device can determine that the cached data is current and can continue communication on the reestablished connection. If the first device receives the request but a write does not complete successfully in a determined amount of time, the first device can determine that the second device has a stale cache and can send a service change request. The second device, receiving the change request, can flush the local cache and request current service data, which can then be cached and used for communications with the first device. In this way, service data only has to be transferred in the event of an update, and a client can determine an update even in the event of a disconnection.

Various other functions can be implemented within the various embodiments as well as discussed and suggested elsewhere herein.

FIG. 1 illustrates an example environment 100 in which aspects of various embodiments can be implemented. In this example, a user might have a number of different devices that are able to communicate using at least one wireless communication protocol. In this example, the user might have a smartwatch 102 or fitness tracker, which the user would like to be able to communicate with a smartphone 104 and a tablet computer 106. The ability to communicate with multiple devices can enable a user to obtain information from the smartwatch 102, such as heart rate data captured using a sensor on the smartwatch, using an application installed on either the smartphone 104 or the tablet 106. The user may also want the smartwatch 102 to be able to communicate with a service provider 108, or other such entity, that is able to obtain and process data from the smartwatch and provide functionality that may not otherwise be available on the smartwatch or the applications installed on the individual devices. The smartwatch may be able to communicate with the service provider 108 through at least one network 110, such as the Internet or a cellular network, or may communicate over a wireless connection such as Bluetooth® to one of the individual devices, which can then communicate over the at least one network. There may be a number of other types of, or reasons for, communications in various embodiments.

In addition to simply being able to communicate, the user may also want the devices to be able to communicate in a number of ways or with certain aspects. For example, the user may want communications between the devices to be secure, particularly where the data may include personal health data or other such communications. The device or application providers may also be required to secure this information in at least some situations. The user may want the devices to be able to communicate with each other concurrently, rather than sequentially. This may be particularly true where pairing may be required, as the user may prefer that each device be paired at most once, or that not manual pairing is required. The user may also desire the communications to be as standards-based as possible, not only so that little manual intervention is required on the part of the user but also so that the devices can communicate with as many other types of devices as possible, which is often not the case for various proprietary formats. A user may thus desire to be able to walk in a room with one device and have it automatically be able to communicate with another target device with little to no effort on the part of the user.

In various conventional approaches, a device will utilize a communication technology such as Wi-Fi to communicate with other devices using wireless local area networking (WLAN). Smaller or lower capacity devices, such as many Internet of Things (IoT) devices, instead utilize a communication technology such as Bluetooth®, and in particular Bluetooth Low Energy (BLE) that has very low power consumption. In order to achieve this low rate of power consumption with respect to technologies such as Wi-Fi, however, BLE has relatively limited transmission range, bandwidth, and data transmission capabilities. BLE was designed to send small packets or "chunks" of data, such as for data captured by a sensor on an IoT device. For the smartwatch 102 of FIG. 1, BLE can be used to transmit information, such as user heart rate data captured by at least one sensor (or other such mechanism) in the smartwatch, to the user's smartphone 104 for tracking or other such usage. It may be desirable to transmit this information to the larger and more powerful smartphone for a number of different reasons, such as improved analysis capability and storage capacity, and ability to transmit over a network to a service provider 108, among other such options.

Figure 2:
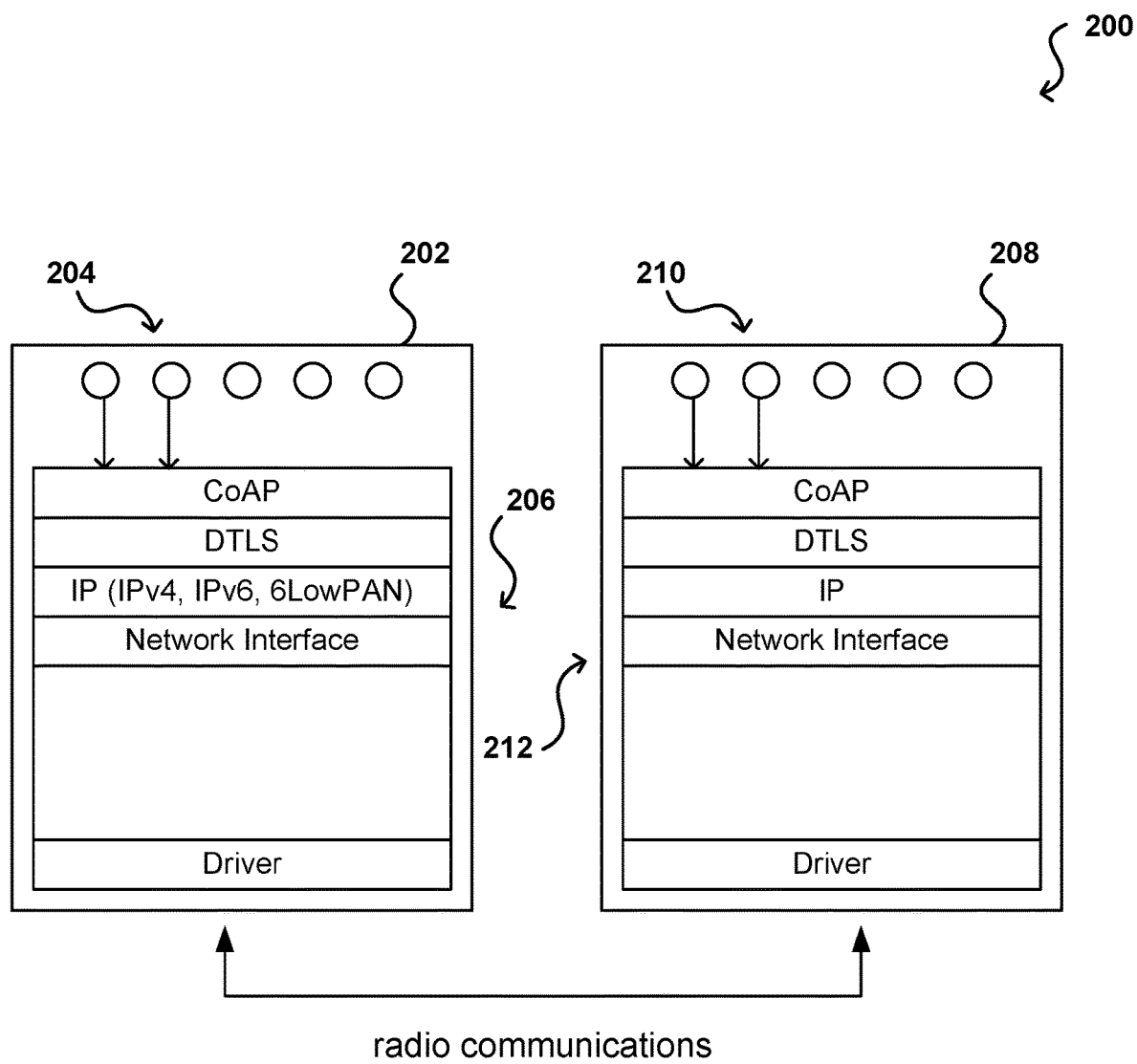
FIG. 2 illustrates an example set of devices that are able to communicate in accordance with various embodiments.

FIG. 2 illustrates an example configuration 200 wherein a first device 202 is able to communicate with a second device 208 using radio communications, in accordance with at least one embodiment. In this example, the radio communications can utilize a technology such as Bluetooth for bi-directional data transfer. The devices can connect and communicate via Bluetooth using a conventional discover and pair approach in at least one embodiment. Applications on the first device 202 that want to communicate with the second device 208 can send a request, for example, through one or more application programming interfaces (APIs) 204 to a network stack on the device. In this example, the devices communicate using a low power, lossy network (a "constrained" network) such that a protocol such as the Constrained Application Protocol (CoAP) can be used for a service layer of the stack. A protocol such as CoAP is well suited for Internet communications, and can provide aspects such as low overhead, multicast support, and simplicity of operation that are advantageous for IoT and other such devices. CoAP is able to run on devices that support the User Datagram Protocol (UDP). The CoAP layer in this example sits on a Datagram Transport Layer Security (DTLS) protocol layer that can provide security for communications from the applications 204 using, for example, Transport Layer Security (TLS). Other standards-based protocols can be used as well in other embodiments. DTLS utilizes UDP communications in at least some embodiments. Many conventional IoT devices utilize DTLS as the security protocol for CoAP communications. The CoAP or other application protocol layer can sit on a routing layer, which in this case is an Internet Protocol routing layer. The protocol may be IPv4 or IPv6 in some embodiments, which provides identification and location support for devices on an IP-based network, which can be used to route communications and data traffic across that network. In at least one embodiment IPv6 over Low-Power Wireless Personal Ares Networks (6LowPAN) can be used to allow lower power and/or capacity devices to transmit information wirelessly using IP. Other technologies such as ZigBee can be used as well in other embodiments. The routing layer can sit on a network interface layer, such as may include interfaces for networks of communications such as Wi-Fi, Ethernet, Bluetooth, and the like. Communications passing through the stack 206 on the first device 202 can be sent over a radio communications channel, such as Bluetooth, and received to a second device 208. The communication will pass through a similar stack 212 on the second device 208 to be received to one or more applications executing on the second device 208. The applications on the second device can use one or more APIs 210 to access the stack. As illustrated in FIG. 2, the stacks and corresponding configuration on the devices are symmetric so that either device can make a request to the other device without either device acting in a master or slave role. While proprietary technologies can be used as well for any of the components illustrated, such approaches can be costly and not widely adopted or trusted, such that in at least one embodiment an attempt is made to use standards-based technologies where appropriate.

In at least one embodiment, the IP layer of the stack is a local IP stack that can send IP packets through the respective network interface. The network interface takes the IP packet and sends it through a transport, which in this case relates to Bluetooth communications. There may be a Bluetooth stack on the device as well, and an operating system on the device may expose an API (not illustrated) to access the Bluetooth functionality. The driver layer in this example may include or expose an API for accessing Bluetooth or other radio functionality.

In a conventional approach, a General Attribute Profile (GATT) API is utilized that defines the way in which two BLE devices transfer data using services and characteristics. GATT communications are considered to be exclusive, in that a BLE device can only be connected to a single device, such as a smartphone or tablet, at any given time. As soon as a BLE device connects to another device, that BLE device will stop advertising such that other devices will not be able to discover and connect with the BLE device until an existing connection to the single device (e.g., smartphone) is broken. GATT uses services to break data into logic entities and contain specific chunks of data or "characteristics."

Each characteristic can encapsulate a single data point, which may correspond to an array of related data in some instances. Services and characteristics are all associated with individual identifiers, such as unique UUIDs, which can each be 16-bit for BLE services. Characteristics can also have values associated therewith that indicate permissions for the value, such as whether it can be read or written.

A GATT packet will have a maximum size, such as is specified by the Maximum Transmission Unit (MTU). The implementation of the Bluetooth stack can be a key factor in determining the GATT MTU on the various devices in at least some embodiments. The MTU in various Bluetooth-based embodiments is a value that is at least 23 bytes in length. Thus, when data is received to be transmitted, the data must be broken into chunks so it can be transmitted in packets that are, at most, of the MTU in size. It should be noted that some of the length of the packet corresponds to header information that is to be used for routing, as well as for reassembling the data from the packets received on the other device.

Figure 3A:
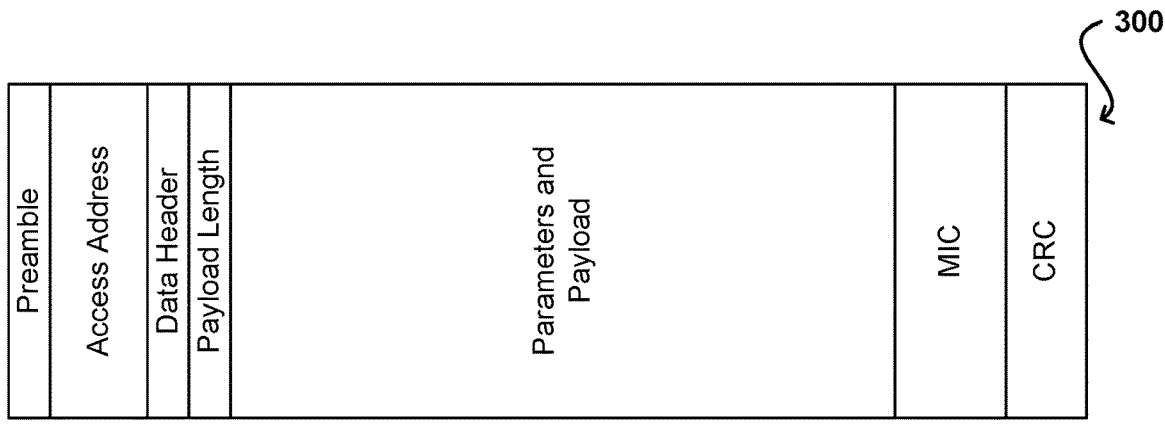
FIGS. 3A, 3B, 3C, and 3D illustrate an example packet compression approach that can be utilized in accordance with various embodiments.

FIG. 3A illustrates an example packet 300 that can be transmitted in accordance with various embodiments. This packet includes various required fields, as well as a payload section, which can hold up to 20 bytes of user data in at least one embodiment. The example packet includes a header field and an access address field, which typically occupy 1 and 4 bytes, respectively. A data header field and a payload length field follow, followed by the parameter and payload field for storing user data (or other data) to be transmitted. Following the payload are a Message Integrity Check (MIC) field and a Cyclic Redundancy Check (CRC) field to ensure integrity of the data contained in the packet.

There are various challenges to transferring data between devices using such an approach. For example, a device can only be connected to a single other device at any given time as discussed previously. Further, dividing the data into sufficiently small packets can be challenging. Further, the stacks and software are complicated and there are a number of handoffs between technologies from different entities so it can be difficult to recover from data corruption or other such issues. Various other complications can arise from such a system as well.

Accordingly, approaches in accordance with various embodiments can provide for packet management in a way that provides at least some additional level of control. Approaches can provide for the serializing and reliable transfer of data packets. These approaches can provide for packet compression, which can improve performance. Such approaches can also provide for address mapping and translation, which can enable a device to communicate concurrently with multiple external devices using the same protocol. Various other advantages are obtained as well as discussed and suggested in more detail elsewhere herein.

In at least one embodiment, either of two devices can initiate a handshake. Once the handshake is completed successfully, a first device can send a packet to the second device and the second device can respond. This initial set of communications can enable the devices to agree on information for a communication session on which packets of data can be sent back and forth. As mentioned, the symmetric nature of various embodiments enables either device to initiate the handshake. In conventional TCP sessions, for example, one side initiates the connection and waits. Approaches in accordance with various embodiments also can manage the session without storing significant state information, such that it is relatively memory efficient.

Figure 3B:
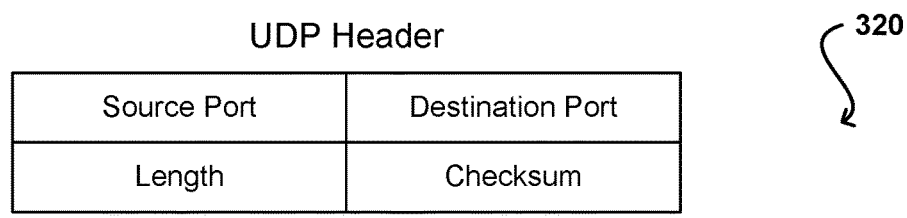
Figure 3C:
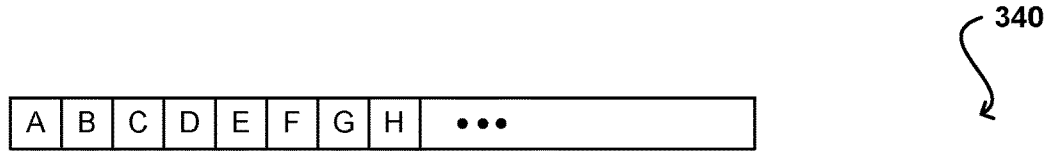

Approaches in accordance with at least one embodiment can also provide for packet compression, which can help to improve performance given limitations on bandwidth and packet size of the various protocols. This can include, for example, IP header compression, where an IP packet header might be 20 bytes in size. FIG. 3B illustrates an example UDP header portion 320, which in and of itself is typically 8 bytes. Thus, even if only 1 byte of data is being sent the packet will still need to include the 20 bytes of header overhead. It is not necessary to send this information in every single packet, however, as at least some of the fields will not change from packet to packet. For example, consider the UDP header 320 of FIG. 3B. The source port and destination port values will generally not change for packets transmitted between the same two devices on the same session. Thus, if the devices can agree upon the default values for these fields, then the values for these fields do not need to be sent with every packet. For example, consider an example packet header 340 illustrated in FIG. 3C. The header includes a number of fields with respective values (A, B, etc.). If it is determined that certain values for certain fields (e.g., B, C, E, F, G) will not change between packets, then these values do not need to be transmitted with every packet. Thus, a header for a subsequent packet may include only values for fields that have not been agreed upon as having been fixed, or having default values. It should be noted that the blank spaces in the header would not represent bytes in the header but are shown for purposes of illustration that certain data values are not included in that header. In this example, it can be seen that values for at least five fields can be determined to be fixed or have default values, and thus do not need to be transmitted. For fields that have at least one byte in size each, this can save at least five bytes per packet.

Figure 3D:
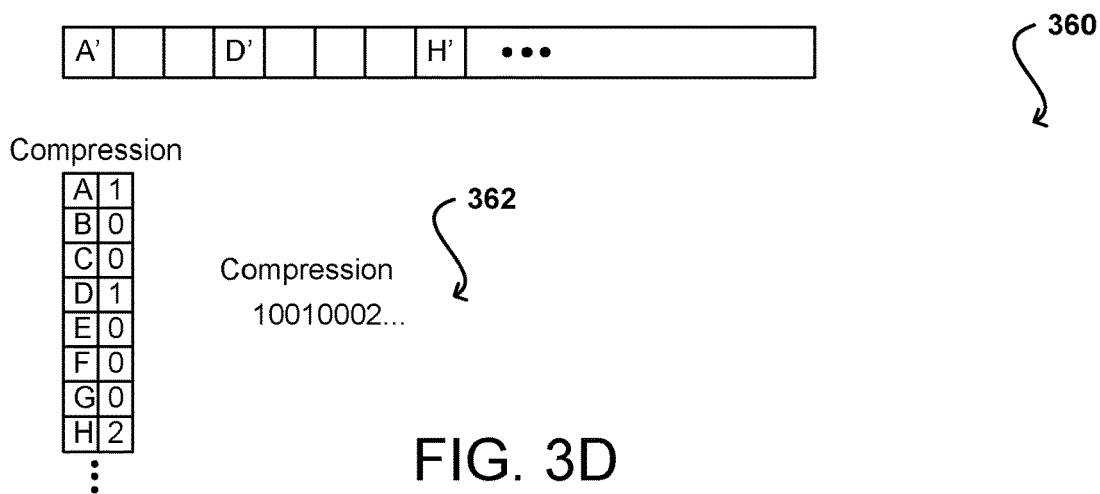

In at least one embodiment, however, each packet can contain an indication as to the fields that are included and/or not included in the packet. This can be useful for situations where one of the previously fixed values might change, or a new value might be determined to be fixed, among other such options. An example data string 362 can be generated, as illustrated in the view 360 of FIG. 3D, that includes a set of flags, which can include one flag for each header field (or at least one flag for each field that is not a required field to be included in each packet). In this example, a mapping can be done to set a flag for each of the fields in the header. A flag of 1 is set for an included field in this example, with a flag value of 0 for fields that do not have values included. This can then be used to generate a single value, say of 16 bits in length for a 16 field header, including a sequence of binary flags. Inclusion of the 16 bit string will still provide significant compression with respect to the five or more bytes of data that are not included in the header. As mentioned elsewhere herein, there may also be multiple possible default, or agreed upon, values that can be utilized for a given field. For example, in the string 362 of FIG. 3D it is illustrated that the value for field H corresponds to agreed-upon value 2. In this case, there may have been at least two possible values for this field that were set as defaults for this field. A transmitting device can then insert a value of 0 in the field to indicate that a receiving device should use a first default value for a non-included field, and a value of 2 in the field to indicate that the receiving device should use a second default value for the non-included field. A value of 1 in this example would still indicate that the receiving device should utilize the value included in the received header field and not use any default value for that field, if otherwise applicable. Other numbering approaches or flags could be used as well, such as 0 to not use a default value, 1 or A to use a first default value, 2 or B to use a second default value, and so on. In some embodiments a single bit in the field might be used to represent a first default value, and two bits used to represent a second default value.

Such an approach is different from general purpose compression in part because this compression scheme depends on the type of data being sent. A general purpose compression scheme can be used on various types of data independent of the type of file, or the data included in that file. A compression scheme in accordance with at least one embodiment is specific to packet headers and whether the values in those fields may change for subsequent packets. This process can also be used to compress IPv4 packets, for which there is not a compression standard such as 6LowPAN for IPv6 packets. In at least one embodiment there are about a dozen fields in an IP packet header. As mentioned, these can include fields for the source address, the destination address, and so on. When a packet is to be transmitted, the compression algorithm can look at the values of the fields and determine whether the values match agreed upon default values for the fields. The default values can include agreed upon default values, most common values, last known values, or other such determinations. If the value for a non-required field in the header is determined to match the default value for that field then a determination can be made to remove that value from the packet header. Based on the determination as to whether or not to include the value, a corresponding flag in the compression header field value can be set, such as 1 for included and 0 for not included. It might then be the case that only three of the values need to be transmitted, along with a string, list, or other indication of the values that are included in the header. When the packet is received by the other side, a decompression algorithm can look to the compression header field value to determine which values are included in the header. The devices will have agreed that the default value should be used for any value that is not included in the header. If a field value is not included, the decompression value can insert the default value in the appropriate field in the header before passing to the destination application. For values that are included, the values should be read from the header and placed into the appropriate field before passing on to the destination application.

For certain protocols or technologies there may be at least some fields that are required and cannot be removed for purposes of packet compression. An IP packet, for example, may need to include at least basic header information identifying it as an IP packet, and may need in some embodiments to include information about the length of the packet, which will not be fixed for all packets. For IPv4 packets, for example, the first three bytes (for the preamble and access address) are required and are not considered for compression in at least one embodiment. Fields that are map-specific can be located after this initial set of header fields but before the payload. In this way, even though the packet header is compressed it will still appear and function as an IP packet. In at least one embodiment the header will include a flag indicating that this is a special type of packet that is to be treated according to rules and/or processes discussed and suggested herein. If a value for a field that is normally fixed differs for a particular packet, then that value can be included in the packet and will take the same amount of space as in a conventional packet, so there is no loss but only potential space gain from such compression approaches.

In the 16 bit string example discussed above, the field string can fit nicely into a two byte field. In a situation where there are 16 possible flags but not 16 fields, the additional space can be used in some embodiments to allow for selection of more than one default value. For example, a set of two bits can be used to determine whether the field has been skipped (e.g., 0,0) or whether to use one of three default values (indicated by bit combinations 0,1; 1,0; or 1,1). This can be useful for parameters such as protocol numbers where there may be more than one fixed value possible.

In some embodiments the default values can be set by an application or agreed upon at session initiation. In other embodiments the first packet sent on a session can have the values stored, and any field not included in a subsequent packet should have the previous field filled in. In this way the devices do not have to agree upon a default value, but may only send values that have changed since the previous packet.

Figure 4A:
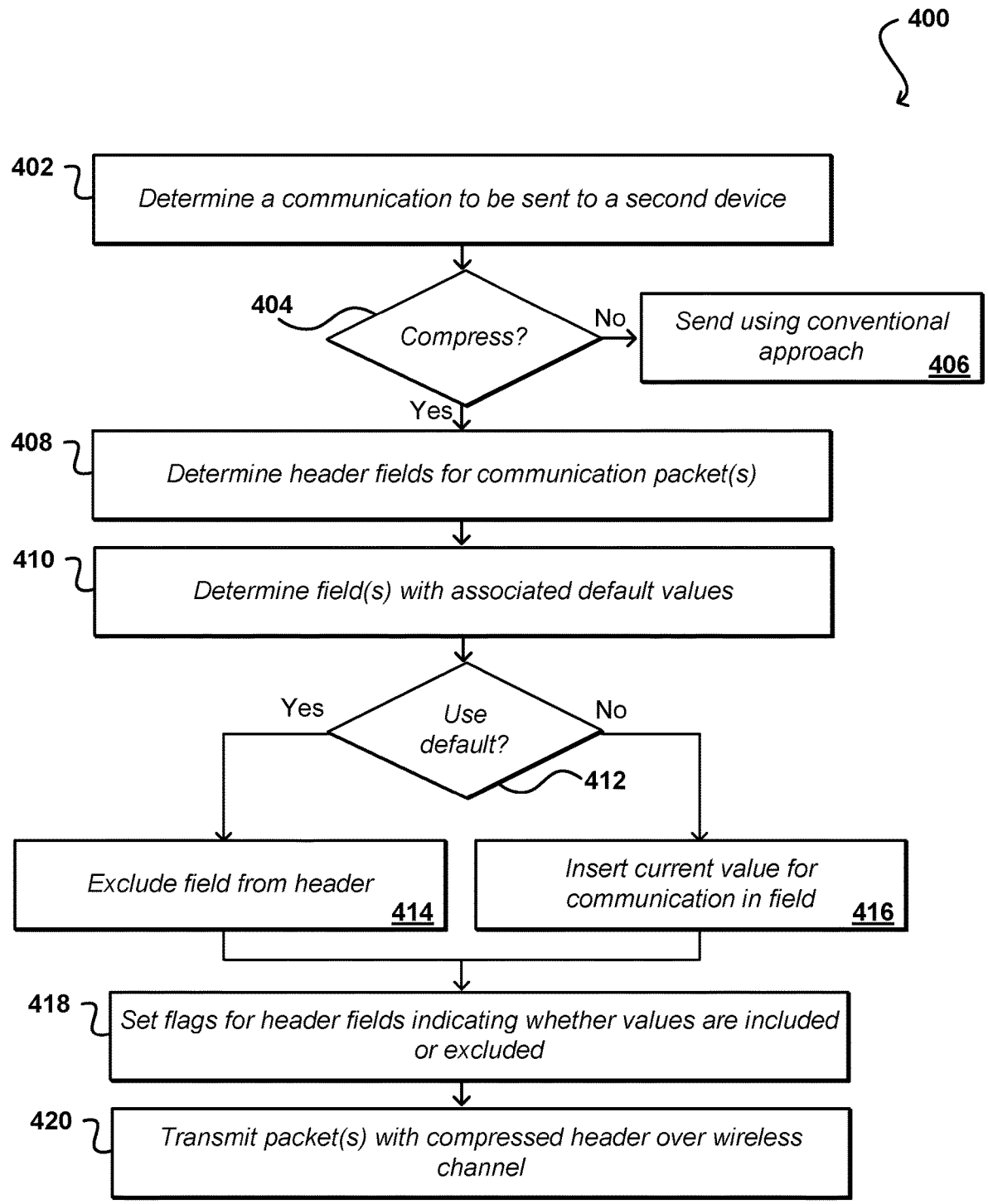
FIGS. 4A and 4B illustrate portions of an example process for compressing packets for wireless communication that can be utilized in accordance with various embodiments.
Figure 4B:
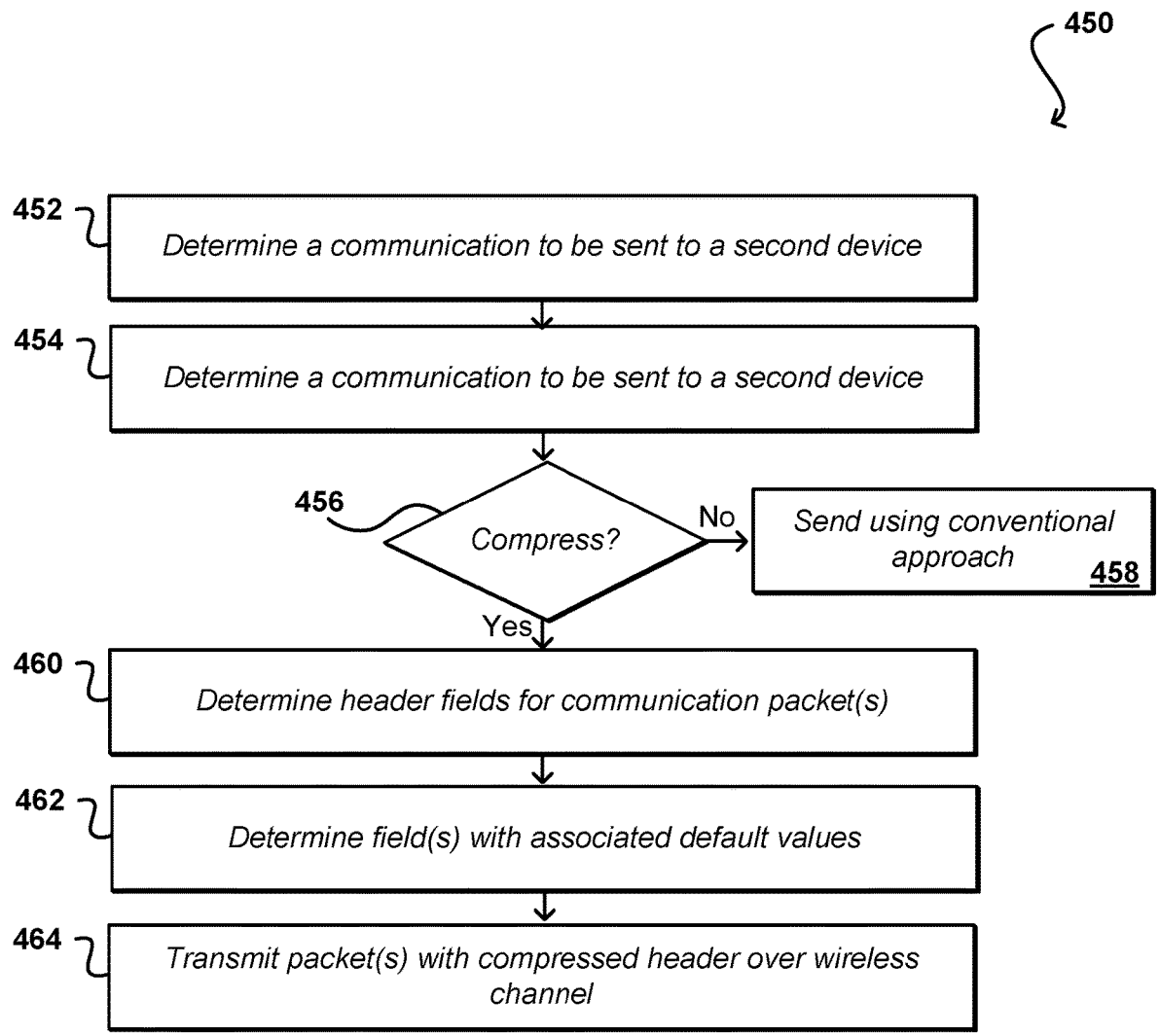

FIGS. 4A and 4B illustrate portions 400, 450 of an example process for performing header compression that can be utilized in accordance with at least one embodiment. In a first portion 400 of the process, a communication is determined 402 that is to be sent to a second device. The communication may be determined in at least some embodiments by being received from an application executing on a device to send the communication, such as by being received to an API exposed by an operating system of the device. A determination can be made 404 as to whether compression is to be applied to the packet, such as where an agreement with the external device was made to use compression at an initiation of the session or as part of a handshaking process, among other such options. If compression is not to be used then the communication can be sent using a general approach, such as may be a default approach used by the device to send communications over a specific wireless channel as discussed herein.

If it is determined that compression should be used, the header fields for the communication packet(s) to be used for the communication can be determined 408, as well as the values to insert in each of those fields. Another determination can be made 410 as to whether any of those fields are associated with default values, such as may have been determined during the initial agreement with the external device in at least one embodiment. For each field that is associated with a default value, the current value can be compared against the default value in order to determine 412 whether to use the default value or a current value associated with this specific communication. If the default value is to be used then the relevant field can be excluded 414 from the header for the relevant packet(s). If the current value does not match the default value, such that the default value should not be used, then the current value can be inserted 416 into the relevant field for the packet(s). A flag can then be set 418 for the various header fields to indicate whether the field has a value included in the header, or whether that field has been excluded and does not include a value, such that the default value should be utilized. As mentioned, this may involve setting a bit in a string that corresponds to that specific field. The packet(s) for the communication can then be transmitted 420 to the target device over a corresponding wireless channel, or other such communication mechanism.

FIG. 4B illustrates another portion 450 of the process that can be utilized in accordance with at least one embodiment. In this example, a packet is received 452 over a wireless channel. This can be, for example, a packet with a compressed header generated as discussed with respect to FIG. 4A. The packet header information can be analyzed 454 and a determination made 456 as to whether the packet has a compressed header per an agreement on the session. If not, the packet can be processed using a general approach, such as the default approach of the operating system as discussed elsewhere herein. If the packet contains a compressed header, the flags in the header can be analyzed 460 to determine which fields have values included and which fields are excluded as having the default (or other agreed upon or previous) value. The values of the excluded fields can be set 462 to the default values, which may be stored in local memory. Information for the packet can then be processed 464 using relevant values for the packet fields as discussed herein. The packet after header decompression should appear as the packet would have appeared without compression in at least one embodiment.

As mentioned, in conventional approaches a device may only be able to communicate with one device at a time using a communication protocol that does not provide for concurrent sessions. Further, in many conventional IP-based systems there is a limited amount of address space (say 32 bit) so there can be a limited number of IP addresses available. IPv6 improves upon this problem, but for IPv4 systems devices can be provisioned between different addresses unless controlled. In order to allow for concurrent device communications, as well as to address limitations in address space, approaches in accordance with at least one embodiment can perform network address translation.

Figure 5:
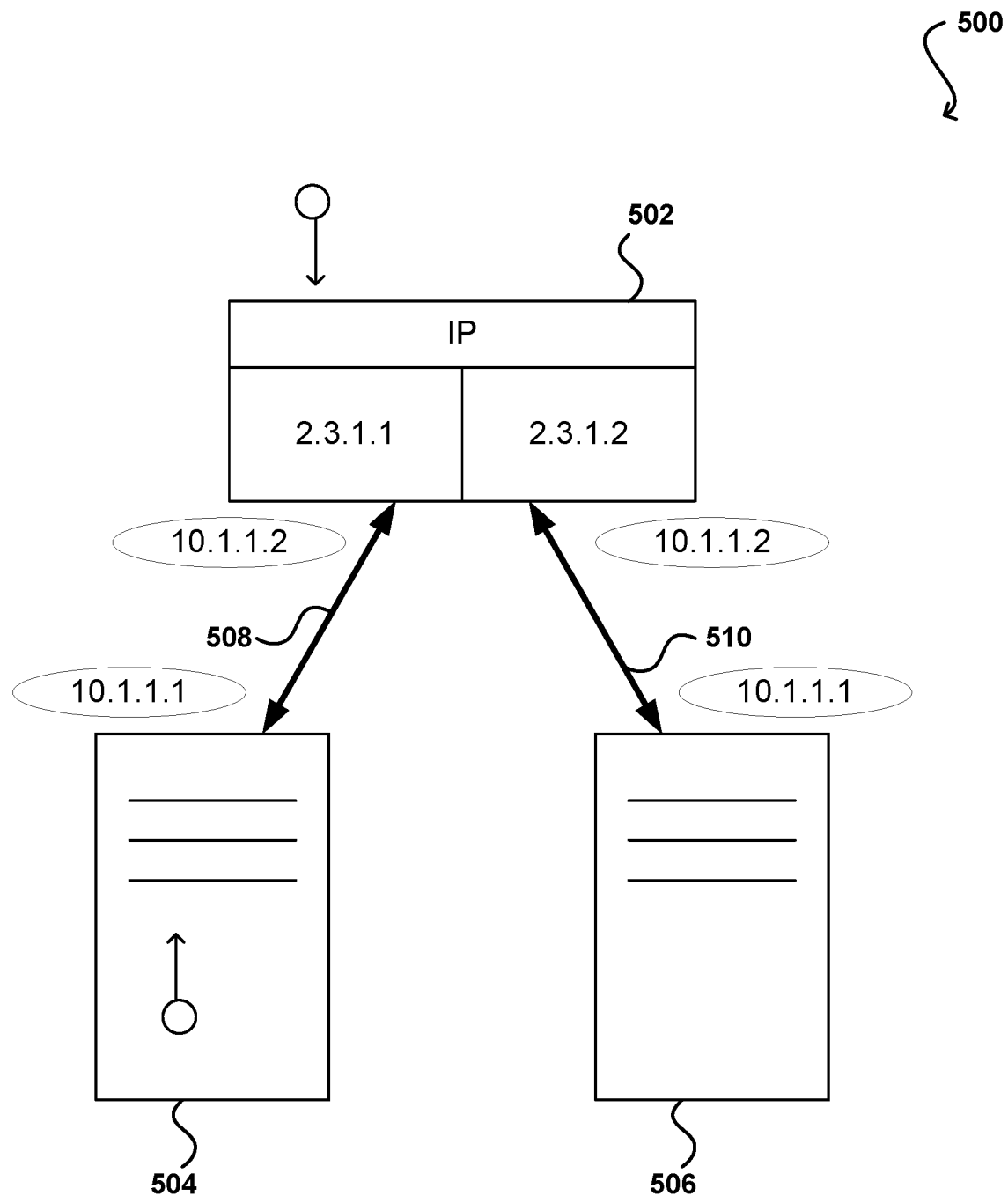
FIG. 5 illustrates an example address mapping approach that can be utilized in accordance with various embodiments.

FIG. 5 illustrates an example address translation approach 500 that can be utilized in accordance with at least one embodiment. Address translation involves mapping addresses on a first side of a translation point to addresses on a second side of the translation point, such that applications executing on the first side can utilize only the first set of addresses without having to know, or even have knowledge of, the second addresses used on the second side. A mapping can be generated and maintain that keeps track of corresponding addresses on the first and second sides of the translation point. As mentioned, it might be the case where it is desirable for a first device, such as a fitness tracker, to be connected to two or more other devices, such as discussed with respect to FIG. 1. As mentioned, those devices do not all communicate with each other concurrently using conventional approaches and are therefore unable to coordinate addresses. Each device will, however, have a fixed notion of an address on their side of a translation point. In the example of FIG. 5, there are two secondary devices 504, 506 communicating with a single primary device 502. In this example the primary device 502 could be the fitness tracker mentioned earlier. If using the same transmission protocol and defaults, the primary device might use the same address (here 10.1.1.2) for bi-directional communications with both devices, and those devices 504, 506 can each have the same assigned address (here 10.1.1.1). Per the protocol, there might only be able to be one connection at a time between the source and destination addresses or ports, etc. Each of the secondary devices 504, 506 would view their respective communications as using the same default source and destination addresses.

For the primary device 502, however, the primary device only has a single IP stack and cannot communicate with two devices having the same IP address, as there will be uncertainty as to which device is to receive which data or communication, or from which device data or a communication is received. In order to allow for these communications with different devices but using the same address information, a remapping can be performed on the primary device 502. In this example, the primary device can assign one of the secondary devices a unique first address (here 2.3.1.1) and a second device a unique second address (here 2.3.1.2), and maintain a mapping such that the translation is performed for transmissions from the primary device to either of the secondary devices 504, 506. Such an approach enables the secondary devices to communicate with the first device as if they are the only secondary device communicating, without having to be aware of the other secondary device or adjust to a different address based upon on the presence of another device. In an embodiment where compression skips default values, this can also be used advantageously as the packets along both communication channels 508, 510 use the same source and destination addresses, which can be set as default values for both and thus excluded from packet headers sent along each channel. This mapping can thus be obtained for free as part of the compression in at least one embodiment, as the default source and destination addresses can be set and agreed upon, which can be different from the IP addresses used by the device. For incoming and outgoing packets, an indication to use the default value can be used, and then each device can fill in the respective default values for a packet. As mentioned, such an approach enables the primary device 502 to communicate with multiple second devices 504, 506 even where the communication protocol does not allow for multiple, concurrent communication sessions.

In at least one embodiment at least some of this functionality can be built into an operating system. Current operating systems and devices do not support this capability, so many devices cannot communicate due in part to the single connectivity limitation. Having the mapping and compression functionality built into the operating system can enable various devices to communicate with a single device using a communication protocol such as BLE. Further, having this built into the OS enables applications to leverage this functionality through an API exposed by the OS, which can greatly simplify application development. Further still, incorporating this into a standard OS can enable many devices to be able to automatically detect or discover each other and establish communications, with little to no effort on the part of the user and with relatively low power or resource consumption. The communications can also be standards-based so that they are supported by a wide variety of devices. This can be useful for various other situations as well, such as in hospital rooms where a number of monitoring devices can all communicate concurrently, as well as with a device being utilized by a doctor or other such entity. In at least one embodiment a doctor can walk into a patient's room that the doctor has never previously been in, and automatically have his or her device communicate with various monitoring devices for a patient without the need to discover or set up communications with these various devices. Such an approach can provide for discovery of the various devices.

As mentioned, the various embodiments can be implemented as a system that includes one or more tracking devices for a given user. In other embodiments the embodiments may be provided as a service, which users can utilize for their devices. Other tracker providers may also subscribe or utilize such a service for their customers. In some embodiments an application programming interface (API) or other such interface may be exposed that enables collected body data, and other information, to be received to the service, which can process the information and send the results back down to the tracker, or related computing device, for access by the user. In some embodiments at least some of the processing may be done on the tracking or computing device itself, but processing by a remote system or service may allow for more robust processing, particularly for tracking devices with limited capacity or processing capability.

Figure 6:
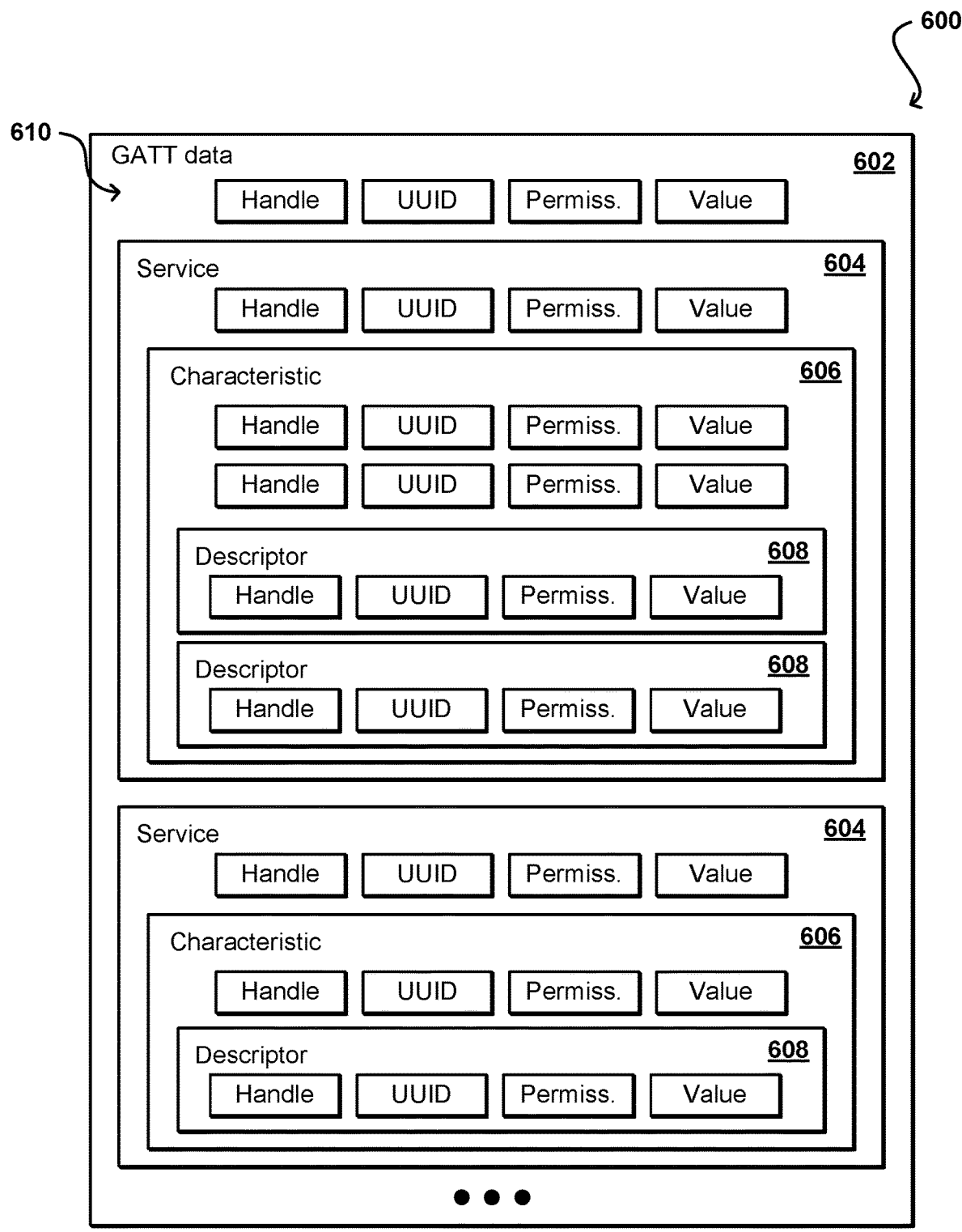
FIG. 6 illustrates an example data scheme for a protocol, such as a GATT protocol, that can be utilized in accordance with various embodiments.

FIG. 6 illustrates an example data structure 600 that can be utilized in accordance with at least one embodiment. In this example, the data structure is a hierarchical GATT structure useful for BLE communications, although other such structures can be used as well within the scope of the various embodiments. As mentioned, the Generic Attribute Profile (GATT) provides a mechanism for exchanging data over a connection such as BLE. GATT uses the Attribute Protocol (ATT) as a transport layer for data exchange, where the GATT data 602 is organized hierarchically by services 604 that each can include one or more pieces of user data referred to as characteristics 606. Characteristics can, in turn, have one or more descriptors 608. Each of these data types can include specific data values 610, as here include a handle, a universally unique identifier (UUID), a permission, and a value. Other values and structures can be used as well in accordance with various embodiments. A handle is a unique 16-bit identifier for each attribute on a GATT server, which makes that attribute addressable. The UUID is a 128-bit number that is globally unique with high certainty, although UUIDs (or other unique identifiers) of other lengths can be used as well. A permission includes metadata specifying which operators can be executed on each attribute, where permissions can include values such as readable, writable, or none, among other such options. The value field is used to store the data content of the attribute. Other fields, such as type, can be used as well.

Figure 7A:
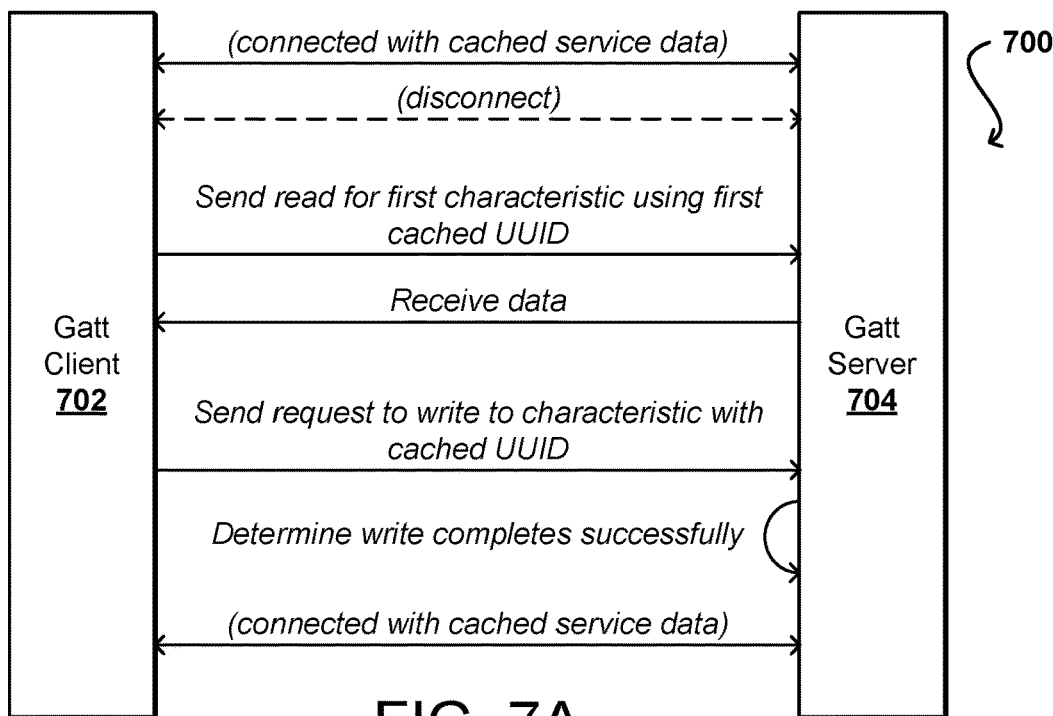
FIGS. 7A and 7B illustrate example message flows that can be utilized in accordance with various embodiments.
Figure 7B:
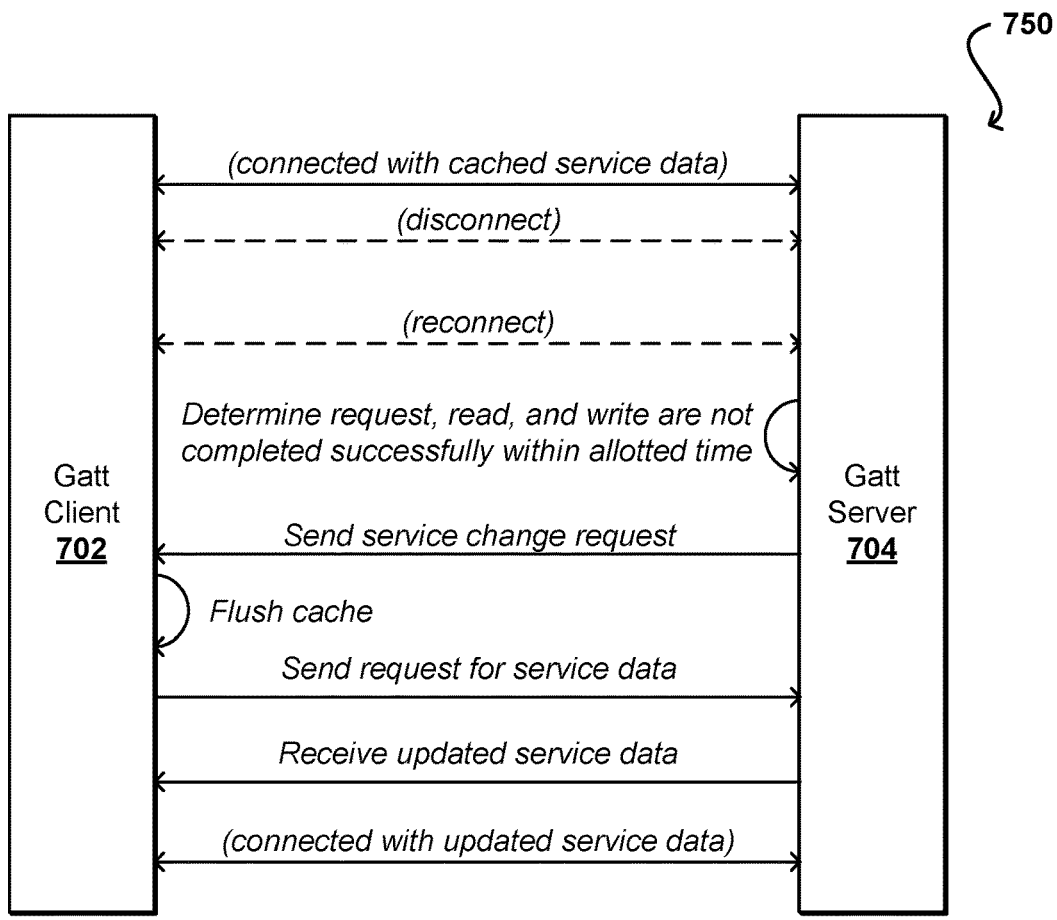

FIGS. 7A and 7B illustrate example message flows 700, 750 that can be used to assist with wireless communication in accordance with various embodiments. While such an approach can be used with two or more devices of various types that are able to communicate wirelessly, these figures illustrate GATT-based communications between a GATT client 702 and a GATT server. A GATT server, as discussed elsewhere herein, does not necessarily refer to a computing server in the traditional sense, such as for an application server or Web server, but refers to a device that offers services (such as discussed with respect to FIG. 6) that can be exposed using a GATT protocol. In an example discussed earlier, a GATT client 702 can correspond to a device such as a smartwatch that can communicate with a device such as a smartphone, tablet, or notebook computer. It should be understood that in some embodiments the client and server can also refer to applications or platforms installed and executing on these devices. In at least one embodiment, a GATT client sends requests and receives responses from the GATT server, and can also receive server-initiated updates from the server when connected. As discussed, a GATT client 702 will send a request for information about services and attributes during a discovery process, and can use these to read and write data to the server. The GATT server 704 can receive requests from one or more clients and send responses as appropriate, as well as providing appropriate updates. The GATT server is responsible for protecting user data and making that data available to the GATT client 702.

As mentioned, in order to avoid communication problems it can be desirable for the client to obtain information about relevant services, characteristics, and attributes from the server. For GATT clients the information can be obtained during a service discovery process. In order to avoid having to continually request this information, the client can cache the information for use in communications. As long as the devices are connected, the server can indicate any changes or updates to the client. As mentioned, however, the devices may not always have an active connection, such as where a user takes one of the devices out of range. In such situations, the server would not be able to push updates to the client. In order to ensure that no updates were missed, the client would need to request the data upon each reconnection, which can take seconds of time and significant aggregated resources to complete, particularly for relatively slow, low power wireless communication channels.

For every GATT service or characteristic there is a long unique identifier (e.g., a UUID) and a short value referred to as a handle, as discussed with respect to FIG. 6. During discovery, a client will ask for information about all available services, and for each such service will receive a UUID and its handle. Once the client has the handle to a service, the client can communicate with the service, such as to read and write data. Further, once a client has the handles for user data then the client can change those handles. Approaches in accordance with various embodiments can take advantage of this data structure to embed update hints within the GATT (or other such) data.

As mentioned, a service exposed by a GATT client will have various characteristics. The characteristics can also have value fields that can be used to store user data. Approaches in accordance with various embodiments can utilize a pair of characteristics, including what will be referred to herein as an ephemeral characteristic. A server can select two characteristics, which may be part of the same service or different services exposed on the server, as long as the server and client agree on the selection. For discussion purposes these characteristics will be referred to as C1 and C2. Characteristic C1 in one embodiment has a known, fixed UUID. In this way, a client device can cache the UUID for C1 and know that the UUID will not change over time. Characteristic C2 is an ephemeral characteristic, in that C2 has a UUID (or other identifier) that changes with every variation or update in the service information, or other relevant information, on the server. Whenever an application on the server detects (or otherwise becomes aware of) a relevant change, such as the addition of a service or modification of an attribute, the server can modify the UUID for C2. The new UUID can be versioned, such that it can be an integer increment over the prior UUID, or can be selected at random, among other such options. As mentioned, the length of the UUIDs is such that the likelihood of a collision is near zero. The value is ephemeral and does not matter, other than the fact that it changes with each relevant update to the server. The new UUID is then set for GATT characteristic C2 and the C1 value is updated accordingly.

An example message flow 700 that can take advantage of this configuration is illustrated in FIG. 7A. In this example, a GATT client 702 is initially connected with a GATT server 704 and a long term, encrypted, trusted relationship can be established between those two devices. As part of a service discovery process, the client can have requested and received service-related data, that the GATT client could have cached. At some point in time, a disconnect between the devices occurs, such as by a device restarting or moving out of range of the other device. Subsequently, the devices may be able to re-establish the connection. As part of the reconnection process, the GATT client 702 can send a request to the Server 702 for service discovery and/or to read a value for characteristic C1 using the cached UUID value on the client device. In this example, the UUID is current and the data from that value can be received from the GATT server 704. After receiving the data, the GATT client 702 can send a request to write a value to characteristic C2, using the cached UUID value on the client device and/or received from the GATT server 704 in response to the read request, which should have the same value. If the UUID for C2 is current then the write should be processed, but if the UUID is no longer correct for characteristic C2 then the write will not complete successfully. The Server 704, upon receiving the write request, can monitor the status to determine whether the write completed successfully within a determined period of time, or within a threshold amount of time, such as in two seconds or less. If it is determined that read and write requests were both received within an acceptable period of time, and the write operation completed successfully, then the Server 704 can determine that the cache on the GATT client 702 is current, else at least one of the UUIDs would have changed as a result of any update and the write would not have occurred. The server, having successfully completed the write, such as by writing a random 1 byte value to a value field of the characteristic C2, in some embodiments can send confirmation of the successful write (or another such confirmation) to the GATT client 702, which upon receiving this confirmation can determine that the cached data is current and can use this cached data to communicate over the re-connected session with the GATT server. In some embodiments no confirmation will be received, but if no change request is received then the GATT client 702 can assume that its cached values are current and can use them for communication.

The message flow 750 of FIG. 7B illustrates a case where at least one UUID is no longer current. In this flow the client will cache service data and experience a disconnect as in FIG. 7A. Subsequently the devices will reconnect. As mentioned above, if the values are current then the GATT client 702 should, within a determined amount of time, send a read request using a UUID for C1, receive the data, and then send a write request to the GATT server 704 using the UUID for C2. In this example, however, at least one of the UUID values is no longer current on the GATT client 702. The GATT server 704, having identified a reconnection, can determine that the entire cache verification process was not successfully completed within the allotted amount of time. This can include, for example, not receiving a read request, receiving a read request with an old UUID, not receiving a subsequent write request, or receiving a write request with an old UUID, among other such options. As such, the GATT server 704 can determine that the cache on the Client 702 is stale, or that at least some of the cached data is no longer current. Accordingly, the GATT server 704 can send a service change request to the GATT client 702. The GATT Client, upon receiving the service change request, can flush the relevant values from cache, such as a GATT repository on the client, and can send a request for the service data from the GATT Server 704. Upon receiving the updated service data, the client can cache the data and utilize the updated data for communication with the server on the re-connected session.

As mentioned, the UUID for C1 is fixed in this example, so the client can always locate that value. In at least some embodiments the UUID can still change under certain circumstances, such that a read operation will fail as discussed above. If current, the client can read the value from C1, which will give it the current UUID of C2. The client can then attempt a small write operation to C2 using that UUID, such as by requesting to write 1 byte with 0 in it. If the UUID for C2 is no longer correct then the client will not be able to write to that characteristic. The server that now has an active connection can have a timer that allows up to a determined amount of time for the client to confirm that it has the correct database by writing that one byte of 0 to C2. If the write does not occur in time then the server can assume that the client has the wrong values in cache and can send a service change request so that the client is assured of receiving the current values for the connection. Thus, if the client device has the correct data in cache, then there will be a simple write of 0 to a value and that will be sufficient to confirm that the cached data is current. This can save over 99% of the time with respect to a full service discovery process. If a service discovery is needed, then that small amount of time is the only extra amount that would be incurred over just doing the discovery. Since updates to firmware, or other such updates, can be relatively rare, approaches in accordance with various embodiments can save significant amounts of time and resources with respect to conventional approaches.

It might be the case that a device, such as a smartphone, might update its firmware, resulting in different services and characteristics being available. Another device, such as a smartwatch, might reconnect to the smartphone after the smartphone restarts and is available. In the case of a BLE-based connection, the MAC address of the smartphone would not have changed, so the connection can be reestablished between the devices. This can be important for the user experience, as a user would not appreciate having to manually reestablish connections or pair devices each time there is a change to one of the devices. Using the fixed MAC address for wireless communications enables the devices to connect securely over time using a stable bond. It would be the case, however, where the cached GATT database on the smartwatch is incorrect. A process such as that discussed above can utilize an ephemeral characteristic process to, in a lightweight manner, determine whether cached GATT data is current or needs refreshing. In various embodiments a device such as a smartphone can function as both a GATT client and a GATT server, such that the smartphone may maintain a GATT database with service information for another GATT server, such as a desktop computer associated with a common user.

Figure 8:
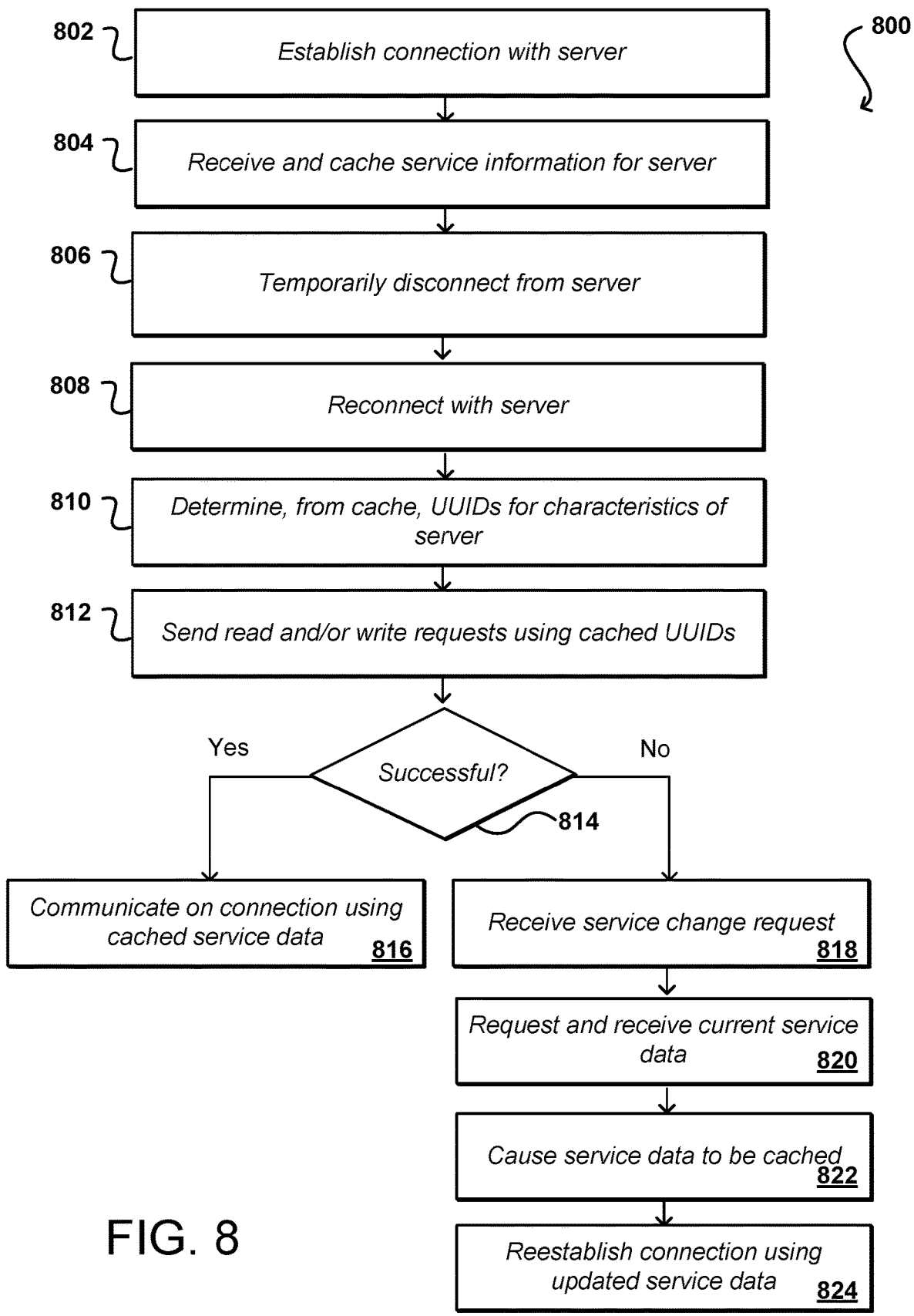
FIG. 8 illustrates an example process for determining whether an update impacting communications has occurred that can be utilized in accordance with various embodiments.

FIG. 8 illustrates an example process 800 for ensuring current communication data that can be utilized in accordance with various embodiments. Although specific details such as use of BLE connections and GATT protocols are discussed in examples herein, it should be understood that various other implementation details and alternatives can take advantages of aspects of the various embodiments. In this example, a client device (such as a GATT client) can establish 802 a connection with another device, referred to herein as a server due to the server providing one or more services. As mentioned, however, the server in this context can be any appropriate computing device, as may include a notebook computer, smartphone, wearable computer, and the like. The connection can be established according to the wireless communication protocol utilized by the devices. In this example, the client device will receive 804 service information from the server and can cache that information locally on the client device. In some embodiments, this can include receiving GATT information relating to services and characteristics, and caching that information to a GATT database. At some point, the client will temporarily disconnect 806 from the server, due to an action such as one the devices restarting or moving out of communication range.

Subsequently, conditions will enable those devices to reconnect 808. In this example, the client device can determine 810, using the cached server information, one or more identifiers such as a UUID for each of a pair of ephemeral characteristics stored on the server. The client can send 812 read and/or write requests to the server using the appropriate cached UUID values. As mentioned, this can include a first read request using a first UUID value and a subsequent write request using a second UUID value in at least some embodiments. As mentioned, the value to be written can be a small value with no meaning other than its use to ensure that the corresponding UUID value is current. A determination can be made 814 as to whether these requests were successful, such as by receiving data in response to the read request and not receiving a change request in response to either request. If it is determined that the requests were successful then the client can determine that its cached information is current, or at least that there have been no changes since caching of the data, and a connection between the devices can be enable the devices to communicate 816 using the cached service data for communication. If, however, the requests or operations were unable to be performed successfully, within an allotted amount of time, a service change request can be received 818 from the server. In this case, the client can determine that the cached data is, or at least may be, no longer current. In this case, the client device (or an operating system operating on the client) can flush the cache to delete the cached service data and related information. The client can request and receive 820 current service data back from the server. The client (or an operating system operating on the client) can then cause 822 this service data to be cached in local cache and can reestablish 824 communication with the server using the updated service data for communication.

Figure 9:
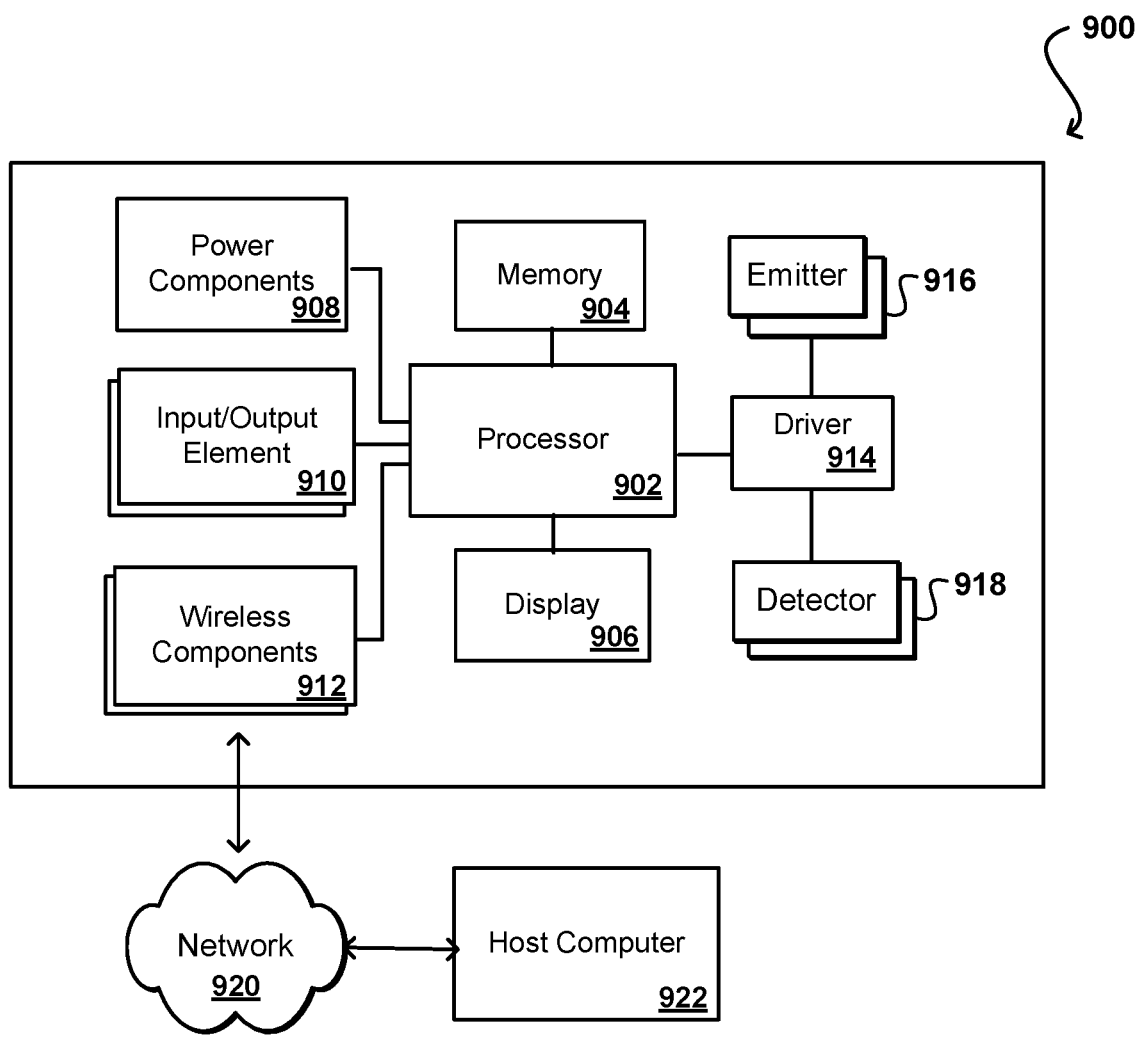
FIG. 9 illustrates an example environment in which aspects of various embodiments can be implemented.

FIG. 9 illustrates components of an example system 900 that can be utilized in accordance with various embodiments. In this example, the device includes at least one processor 902, such as a central processing unit (CPU) or graphics processing unit (GPU) for executing instructions that can be stored in a memory device 904, such as may include flash memory or DRAM, among other such options. As would be apparent to one of ordinary skill in the art, the device can include many types of memory, data storage, or computer-readable media, such as data storage for program instructions for execution by a processor. The same or separate storage can be used for images or data, a removable memory can be available for sharing information with other devices, and any number of communication approaches can be available for sharing with other devices. The device typically will include some type of display 906, such as a touch screen, organic light emitting diode (OLED), or liquid crystal display (LCD), although devices might convey information via other means, such as through audio speakers or projectors.

A tracker or similar device will include at least one motion detection sensor, which as illustrated can include at least one I/O element 910 of the device. Such a sensor can determine and/or detect orientation and/or movement of the device. Such an element can include, for example, an accelerometer, inertial sensor, altimeter, or gyroscope operable to detect movement (e.g., rotational movement, angular displacement, tilt, position, orientation, motion along a non-linear path, etc.) of the device. An orientation determining element can also include an electronic or digital compass, which can indicate a direction (e.g., north or south) in which the device is determined to be pointing (e.g., with respect to a primary axis or other such aspect). A device may also include an I/O element 910 for determining a location of the device (or the user of the device). Such a positioning element can include or comprise a GPS or similar location-determining element(s) operable to determine relative coordinates for a position of the device.

Positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination. The I/O elements may also include one or more biometric sensors, optical sensors, barometric sensors (e.g., altimeter, etc.), and the like.

As mentioned above, some embodiments use the element(s) to track the location and/or motion of a user. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. The example device also includes one or more wireless components 912 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art. The device also includes one or more power components 908, such as may include a battery operable to be recharged through conventional plug-in approaches, or through other approaches such as capacitive charging through proximity with a power mat or other such device. In some embodiments the device can include at least one additional input/output device 910 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As mentioned, many embodiments will include at least some combination of one or more emitters 916 and one or more detectors 918 for measuring data for one or more metrics of a human body, such as for a person wearing the tracker device. In some embodiments this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example device in FIG. 9 includes emitters 916 and detectors 918 capable of being used, in one example, for obtaining optical photoplethsymogram (PPG) measurements. Some PPG technologies rely on detecting light at a single spatial location, or adding signals taken from two or more spatial locations. Both of these approaches result in a single spatial measurement from which the heart rate (HR) estimate (or other physiological metrics) can be determined. In some embodiments, a PPG device employs a single light source coupled to a single detector (i.e., a single light path). Alternatively, a PPG device may employ multiple light sources coupled to a single detector or multiple detectors (i.e., two or more light paths). In other embodiments, a PPG device employs multiple detectors coupled to a single light source or multiple light sources (i.e., two or more light paths). In some cases, the light source(s) may be configured to emit one or more of green, red, and/or infrared light. For example, a PPG device may employ a single light source and two or more light detectors each configured to detect a specific wavelength or wavelength range. In some cases, each detector is configured to detect a different wavelength or wavelength range from one another. In other cases, two or more detectors configured to detect the same wavelength or wavelength range. In yet another case, one or more detectors configured to detect a specific wavelength or wavelength range different from one or more other detectors). In embodiments employing multiple light paths, the PPG device may determine an average of the signals resulting from the multiple light paths before determining an HR estimate or other physiological metrics. Such a PPG device may not be able to resolve individual light paths or separately utilize the individual signals resulting from the multiple light paths.

Referring back to FIG. 9, an example device may further comprise one or more processors 902 coupled to memory 904, a display 906, a bus, one or more input/output (I/O) elements 910, and wireless networking components 912, among other such options. A display and/or I/O devices may be omitted in certain embodiments. In an embodiment, the device is a wristband and the display is configured such that the display faces away from the outside of a user's wrist when the user wears the device. In other embodiments, the display may be omitted and data detected by the device may be transmitted using the wireless networking interface via near-field communication (NFC), Bluetooth, Wi-Fi, or other suitable wireless communication protocols over at least one network 920 to a host computer 922 for analysis, display, reporting, or other such use.

The memory 904 may comprise RAM, ROM, FLASH memory, or other non-transitory digital data storage, and may include a control program comprising sequences of instructions which, when loaded from the memory and executed using the processor 902, cause the processor 902 to perform the functions that are described herein. The emitters 916 and detectors 918 may be coupled to a bus directly or indirectly using driver circuitry by which the processor 902 may drive the light emitters 916 and obtain signals from the light detectors 918. The host computer 922 communicate with the wireless networking components 912 via one or more networks 920, which may include one or more local area networks, wide area networks, and/or internetworks using any of terrestrial or satellite links. In some embodiments, the host computer 922 executes control programs and/or application programs that are configured to perform some of the functions described herein.

In some embodiments, each emitter 916 can be individually controlled, or each light detector 918 can be individually read out when multiple detectors are used, and in such embodiments, PPG sensor data along several different light paths can be collected. The control program can utilize the collected data to provide a more accurate estimation or HR and/or other physiological metrics. In related aspects, the processor 902 and other component(s) of the PPG device may be implemented as a System-on-Chip (SoC) that may include one or more central processing unit (CPU) cores that use one or more reduced instruction set computing (RISC) instruction sets, and/or other software and hardware to support the PPG device.

In various embodiments, the emitters (or light sources) comprise electronic semiconductor light sources, such as LEDs, or produce light using any of filaments, phosphors, or laser. In some implementations, each of the light sources emits light having the same center wavelength or within the same wavelength range. In other cases, at least one light source may emit light having a center wavelength that is different from another one of the light sources. The center wavelengths of the light emitted by the light sources may be in the range of 495 nm to 570 nm. For example, a particular green light source may emit light with a center wavelength of 528 nm. In other embodiments, one or more of the light sources may emit red light (e.g., 660 nm center wavelength) or IR light (e.g., 940 nm center wavelength). In some embodiments, one or more of the light sources may emit light with peak wavelengths typically in the range of 650 nm to 940 nm. For example, in various embodiments, a particular red light source may emit light with a peak wavelength of 660 nm, and one or more infrared light sources may emit light with peak wavelengths in the range of 750 nm to 1700 nm. By way of example and not limitation, a particular infrared light source may emit light with a peak wavelength of 730 nm, 760 nm, 850 nm, 870 nm, or 940 nm. In some cases, commercial light sources such as LEDs may provide output at about 20 nm intervals with a center wavelength tolerance of +/−10 nm from the manufacturer's specified wavelength and thus one possible range of useful peak wavelengths for the light sources is 650 nm to 950 nm. The green light sources may be configured to emit light with wavelengths in the range of 495 nm to 570 nm. For example, a particular green light source may emit light with a wavelength of 528 nm. The green light sources may be equally spaced from light detectors as the pairs of red and infrared light sources. For example, if the distance between light detectors and a center of a first red light source is 2 mm, the distance between light detectors and a green light source may also be 2 mm (e.g., equidistant). In some other cases, the distance between the light detectors and one or more light sources is not equidistant. Further, in some embodiments, one or more of the light sources may comprise a single LED package that emits multiple wavelengths, such as green, red and infrared wavelengths, at the same or substantially the same (e.g., less than 1 mm difference) location with respect to multiple detectors. Such LEDs may include multiple semiconductor elements co-located using a single die in a single package.

The spacing of the light sources may be measured from the side of the light source or the center of the light source. For example, the light sources may be configured such that the center of each light source is at a first distance from the edge of the closest one of the light detectors. In some embodiments, the first distance may be 2 mm. In some implementations, each light source is located at a second distance from the closest one of the light sources, and each light detector is located at a third distance from the closest one of the light detectors. In some embodiments, the second and third distances are identical to the first distance. In other embodiments, each of the second and third distances is different from the first distance. The second distance may be identical to or different from the third distance. The particular magnitude of the spacing may depend on a number of factors and this disclosure does not limit the embodiments to any particular spacing. For example, spacing in a range of 1 mm (or less) to 10 mm would be workable in various embodiments.

In some embodiments, independent control of all light sources is provided. In other embodiments, several light sources are controlled together as a gang or bank. A benefit of independent control of each light source, or independent readout from each of multiple detectors (e.g., obtaining independent signals based on the same or different light wavelengths from each of multiple detectors), is that a multiple light path approach may be used to improve the estimation of HR and/or other physiological metrics, as discussed further herein.

Light detectors may comprise one or more sensors that are adapted to detect wavelengths of light emitted from the light sources. A particular light source combined with a particular detector may comprise a sensor such as a PPG sensor. A first PPG sensor and a second PPG sensor can share components, such as the same light sources and/or detectors, or have different components and thus the term "PPG sensor," in addition to having its ordinary meaning, may refer to any of such arrangements although actual embodiments may use multiple components in implementing a PPG sensor. The term "PPG device," in addition to having its ordinary meaning, may refer to a device including a PPG sensor. A light detector, in an embodiment, may comprise one or more detectors for detecting each different wavelength of light that is used by the light sources. For example, a first detector may be configured to detect light with a wavelength of 560 nm, a second detector may be configured to detect light with a wavelength of 940 nm, and a third detector may be configured to detect light with a wavelength of 528 nm. Examples include photodiodes fabricated from semiconductor materials and having optical filters that admit only light of a particular wavelength or range of wavelengths. The light detectors may comprise any of a photodiode, phototransistor, charge-coupled device (CCD), thermopile detector, microbolometer, or complementary metal-oxide-semiconductor (CMOS) sensor. The light detectors may comprise multiple detector elements, as further described herein. One or more of the detectors may comprise a bandpass filter circuit.

In other embodiments, a detector may comprise one or more detectors configured to detect multiple wavelengths of light. For example, a single detector may be configured to tune to different frequencies based on data received from an electrical digital microprocessor coupled to detectors. In another way, the single detector may include multiple active areas where each active area is sensitive to a given range of wavelengths. In an embodiment, a single detector is configured to detect light with wavelengths in the red and IR frequencies and a second detector is configured to detect light with wavelengths in the green frequencies. Further, each of the light sources may use any of one or more different wavelengths of light as previously described.

In an embodiment, light detectors can be mounted in a housing with one or more filters that are configured to filter out wavelengths of light other than wavelengths emitted by light sources. For example, a portion of the housing may be covered with a filter which removes ambient light other than light in wavelengths emitted by light sources. For example, signals from light sources may be received at the light detectors through an ambient light filter that filters out an ambient light source that generates an ambient light with a wavelength that is different from the wavelength that is detected by the detector. Although LEDs and photodiodes are used as examples of the light sources and the light detectors, respectively, the techniques described herein may be extended to other types of light sources. For example, edge emitting lasers, surface emitting lasers, LED-pumped phosphors that generate broadband light. The techniques described herein may be extended to other combinations of light sources and detectors. For example, the PPG device may include (i) single or multiple LEDs and a multi-element photodetector (e.g., a camera sensor), (ii) an LED array and single or multiple photodiodes, (iii) a broadband LED-pumped phosphor and detector array with wavelength selective filters on each detector, (iv) spatial light modulator (SLM) (e.g., a digital micromirror device [DMD] or a liquid crystal on silicon [LCoS] device) and single or multiple LEDs, other combinations thereof, or other configurations of light sources and detectors.

Certain flow diagrams are presented herein to illustrate various methods that may be performed by example embodiments. The flow diagrams illustrate example algorithms that may be programmed, using any suitable programming environment or language, to create machine code capable of execution by a CPU or microcontroller of the PPG device. In other words, the flow diagrams, together with the written description in this document, are disclosures of algorithms for aspects of the claimed subject matter, presented at the same level of detail that is normally used for communication of this subject matter among skilled persons in the art to which the disclosure pertains. Various embodiments may be coded using assembly, C, OBJECTIVE-C, C++, JAVA, or other human-readable languages and then compiled, assembled, or otherwise transformed into machine code that can be loaded into ROM, EPROM, or other recordable memory of the activity monitoring apparatus that is coupled to the CPU or microcontroller and then then executed by the CPU or microcontroller.

In an embodiment, signals obtained from multiple light paths may be processed to filter or reject signal components that are associated with motion of the user, using a computer program to identify the motion component of the signal and remove the identified motion component from the composite signal, leaving the cardiac component as a remainder or final signal.

In an embodiment, signals might be collected in variety of activities during day or at night, such as may relate to periods of walking, exercise, or sleep. Other on-device sensors including an accelerometer, gyroscope, or altimeter may be used to categorize or detect the activity, or human posture as a basis to develop the appropriate filters. These filters or signal processing methods might be used for targeted reduction of variability in the PPG data with multiple light paths. As an example and not limitation, the accelerometer data can be used to develop signal processing methods to filter the data and look into a certain posture, removing other body orientations. This can help reduce the noise in the data and get a better assessment of the corresponding physiological variables for the corresponding light paths.

In various embodiments, approaches discussed herein may be performed by one or more of: firmware operating on a monitoring or tracker device or a secondary device, such as a mobile device paired to the monitoring device, a server, host computer, and the like. For example, the monitoring device may execute operations relating to generating signals that are uploaded or otherwise communicated to a server that performs operations for removing the motion components and creating a final estimate value for HR, $SpO_2$, and/or other physiological metrics. Alternatively, the monitoring device may execute operations relating to generating the monitoring signals and removing the motion components to produce a final estimate value for HR, $SpO_2$, and/or other physiological metrics local to the monitoring device. In this case, the final estimate may be uploaded or otherwise communicated to a server such as host computer that performs other operations using the value.

An example monitoring or tracker device can collect one or more types of physiological and/or environmental data from one or more sensor(s) and/or external devices and communicate or relay such information to other devices (e.g., host computer or another server), thus permitting the collected data to be viewed, for example, using a web browser or network-based application. For example, while being worn by the user, a tracker device may perform biometric monitoring via calculating and storing the user's step count using one or more sensor(s). The tracker device may transmit data representative of the user's step count to an account on a web service (e.g., www.fitbit.com), computer, mobile phone, and/or health station where the data may be stored, processed, and/or visualized by the user. The tracker device may measure or calculate other physiological metric(s) in addition to, or in place of, the user's step count. Such physiological metric(s) may include, but are not limited to: energy expenditure, e.g., calorie burn; floors climbed and/or descended; HR; heartbeat waveform; HR variability; HR recovery; respiration, $SpO_2$, blood volume, blood glucose, skin moisture and skin pigmentation level, location and/or heading (e.g., via a GPS, global navigation satellite system (GLONASS), or a similar system); elevation; ambulatory speed and/or distance traveled; swimming lap count; swimming stroke type and count detected; bicycle distance and/or speed; blood glucose; skin conduction; skin and/or body temperature; muscle state measured via electromyography; brain activity as measured by electroencephalography; weight; body fat; caloric intake; nutritional intake from food; medication intake; sleep periods (e.g., clock time, sleep phases, sleep quality and/or duration); pH levels; hydration levels; respiration rate; and/or other physiological metrics.

An example tracker or monitoring device may also measure or calculate metrics related to the environment around the user (e.g., with one or more environmental sensor(s)), such as, for example, barometric pressure, weather conditions (e.g., temperature, humidity, pollen count, air quality, rain/snow conditions, wind speed), light exposure (e.g., ambient light, ultra-violet (UV) light exposure, time and/or duration spent in darkness), noise exposure, radiation exposure, and/or magnetic field. Furthermore, a tracker device (and/or the host computer and/or another server) may collect data from one or more sensors of the device, and may calculate metrics derived from such data. For example, a tracker device may calculate the user's stress or relaxation levels based on a combination of HR variability, skin conduction, noise pollution, and/or sleep quality. In another example, a tracker device may determine the efficacy of a medical intervention, for example, medication, based on a combination of data relating to medication intake, sleep, and/or activity. In yet another example, a tracker device may determine the efficacy of an allergy medication based on a combination of data relating to pollen levels, medication intake, sleep and/or activity. These examples are provided for illustration only and are not intended to be limiting or exhaustive.

An example monitoring device may include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. A monitoring system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting, at a client device, a wireless connection to a computing device, service information for the computing device being stored in local cache from a prior connection to the computing device;
   sending, via the client device, a request using an identifier from the service information stored in the local cache;
   in response to the request being unable to be performed on the computing device within an allotted period of time, receiving, at the client device, a change request;
   in response to the receiving the change request, flushing, at the client device, the local cache to remove at least a portion of the service information;

receiving, at the client device, current service information for the computing device; and using, at the client device, the current service information to communicate with the computing device over the wireless connection.

2. The computer-implemented method of claim 1, further comprising:

detecting the wireless connection after a period of disconnect;

sending a subsequent request using the identifier from the current service information that is able to be performed within the allotted period of time; and using the current service information to communicate with the computing device over the wireless connection.

3. The computer-implemented method of claim 1, wherein the identifier is updated for each change to the service information on the computing device.

4. The computer-implemented method of claim 1, further comprising:

being disconnected from the computing device for the prior connection before detecting the wireless connection to the computing device.

5. The computer-implemented method of claim 1, further comprising:

executing a discovery process in order to obtain the service information from the computing device, the service information able to be stored to the local cache.

6. The computer-implemented method of claim 1, wherein the wireless connection is a Bluetooth® Low Energy (BLE) channel and the identifier is for a characteristic according to a Generic Attribute Profile (GATT) protocol.

7. The computer-implemented method of claim 6, wherein the service information includes a fixed characteristic with a fixed identifier that stores a value indicating the identifier.

8. The computer-implemented method of claim 1, further comprising:

detecting a wireless reconnection to the computing device after a disconnection; and receiving, in response to a subsequent read or write request not being received within the allotted period of time, a second change request.

9. A computer-implemented method, comprising:

detecting a wireless connection to a client device, service information being stored in local cache on the client device from a prior connection;

determining that a request from the client device is not received and able to be performed, using an identifier from the service information stored in the local cache, within a determined amount of time; and sending, to the client device, a change request, wherein the client device is triggered to flush at least a portion of the service information from the local cache in response to receiving the change request and sending a request for current service information to be stored to the local cache used to communicate over the wireless connection in response to flushing the portion of the service information.

10. The computer-implemented method of claim 9, further comprising:

detecting the wireless connection after a period of disconnect;

receiving, from the client device, a subsequent request using the identifier from the current service information;

determining that the request was performed successfully within the determined amount of time, wherein the client device is confirmed to be able to use the current service information to communicate over the wireless connection.

11. The computer-implemented method of claim 9, further comprising:

updating the identifier for each change to the service information.

12. The computer-implemented method of claim 9, further comprising:

providing the service information to the client device as part of a discovery process, wherein the client device is enabled to store the service information to the local cache.

13. The computer-implemented method of claim 9, wherein the wireless connection is a Bluetooth® Low Energy (BLE) channel and the identifier is for a characteristic according to a Generic Attribute Profile (GATT) protocol.

14. The computer-implemented method of claim 13, wherein the service information includes a fixed characteristic with a fixed identifier that stores a value indicating the identifier.

15. A device, comprising:

at least one processor; and memory including instructions that, when executed by the at least one processor, cause the device to:

detect a wireless connection to a client device, service information being stored in local cache on the client device from a prior connection;

determine that a request from the client device is not received and able to be performed, using an identifier from the service information stored in the local cache, within a determined amount of time; and send, to the client device, a change request, wherein the client device is triggered to flush at least a portion of the service information from the local cache in response to receiving the change request and sending a request for current service information to be stored to the local cache used to communicate over the wireless connection in response to flushing the portion of the service information.

16. The device of claim 15, wherein the instructions when executed further cause the device to:

detect the wireless connection after a period of disconnect;

receive, from the client device, a subsequent request for the characteristic using the characteristic identifier from the current service information;

determine that the request was performed successfully within the determined amount of time, wherein the client device is confirmed to be able to use the current service information to communicate over the wireless connection.

17. The device of claim 15, wherein the instructions when executed further cause the device to:

update the characteristic identifier for each change to the service information.

18. The device of claim 15, wherein the instructions when executed further cause the device to:

provide the service information to the client device as part of a discovery process, wherein the client device is enabled to store the service information to the local cache.

19. The device of claim 15, wherein the wireless connection is a Bluetooth® Low Energy (BLE) channel and the characteristic is a characteristic according to a Generic Attribute Profile (GATT) protocol.

20. The device of claim 15, wherein the service information includes a fixed characteristic with a fixed identifier that stores a value indicating the characteristic identifier.

* * * * *